Patented July 20, 1943

2,324,646

UNITED STATES PATENT OFFICE 2,324,646

LYMPHOGRANULOMA VENEREUM ANTIGEN AND METHOD OF PREPARING IT

Geoffrey W. Rake, Kingston, and Morris F. Shaffer and Clara M. McKee, New Brunswick, N. J., assignors to E. R. Squibb & Sons, New York, N. Y., a corporation of New York No Drawing. Application March 8, 1941, Serial No. 382,334

18 Claims. (Cl. 167—78)

This invention relates to antigens for lymphogranuloma venereum.

Antigens for the diagnosis of this disease have heretofore been obtained either from human pus produced in those cases of supporating bubo due to lymphogranuloma venereum in which no other venereal disease had coexisted and no secondary infection had supervened (Frei antigen), or by propagation of the virus of lymphogranuloma venereum in mouse brain and preparation therefrom of a saline suspension of the killed virus. These antigens, however, were of low titer, and therefore unsuitable for the prophylaxis and therapy of lymphogranuloma venereum.

It is the object of this invention to provide highly-active lymphogranuloma venereum antigens suitable for use in the diagnosis, prophylaxis, and therapy of this disease, and methods of preparing such antigens.

The antigens of this invention are essentially non-infectious (i. e., inactivated or virus-freed) preparations of fowl embryo yolks and/or yolk-sacs which have been diseased with lymphogranuloma venereum. The method of this invention essentially comprises propagating the agent (virus) of lymphogranuloma venereum in the yolk-sacs (i. e. in the yolk sacs proper and in the yolk) of developing fowl-embryos, and preparing a non-infectious suspension of the yolk and/or yolk-sac material in a suitable aqueous medium. Preferably, the antigen is prepared from yolk-sac material because of the usually-higher concentration of virus therein.

In the practice of this invention, an antigen is prepared by propagating (preferably for 2–12 days) a strain or strains of lymphogranuloma venereum virus in the yolk-sac of developing chick-embryos (preferably of 4–15 days' incubation-age), preparing a suspension of the yolk and/or yolk-sac material in a suitable aqueous (preferably physiological saline) medium, separating the infectious material from other constituents (preferably by centrifuging the suspension for ½–2 hours at 2,000–3,000 R. P. M., discarding the sediment, centrifuging the supernatant for 1½–3 hours at 6,000–18,000 R. P. M., and resuspending the sediment obtained by the second centrifugation in a suitable aqueous medium to at least the original dilution), and inactivating the infectious agent (e. g., by heat-sterilizing the suspension at 60° C., or treating with 0.1–0.2% formalin). Alternatively, an antigen may be obtained by removing the infectious agent from the suspension of yolk and/or yolk-sac material. Thus, a virus-free preparation may be obtained by filtering the suspension (preferably after centrifuging for ½–2 hours at 2,000–3,000 R. P. M. and discarding the sediment) at either positive or negative pressure through a filter (or membrane) capable of retaining cultivatable bacteria, inter alia, Berkefeld candles, Chamberland candles, sintered-glass filters, collodion (e. g., Gradicol) membrances, and (preferably) Seitz E. K. pads.

The virus may be propagated in the yolk-sacs of developing embryos of fowls other than chickens, e. g., ducks, geese, etc., but chicken eggs are preferred from the standpoint of availability.

The virus used in the preparation of the antigens of this invention may be obtained from any suitable source; preferably, the virus used is a yolk-sac-passage virus initiated with mouse-brain material.

The following examples are illustrative of the invention:

*Example 1*

Seven chicken eggs are each inoculated in the yolk-sac (in the known manner) with 1 cc. of a 1/100–1/10,000 dilution of bacteriologically-sterile yolk-sac harvested from eggs infected by this route with lymphogranuloma venereum virus.

After 5–6 days (or as soon as the eggs are moribund or dead), the eggs are opened and the yolk-sacs removed, lightly washed to remove excess yolk, and weighed. The yolk-sacs are then ground with Pyrex or quartz fragments, and the emulsion made up to a 10% suspension with physiological saline solution. The suspension is centrifuged for 30 minutes at 2,000 R. P. M. in the cold, the sediment discarded, and the supernatant recentrifuged at 12,500 R. P. M. in the cold for 1½ hours. The sedimented granules are resuspended in physiological saline solution to form a 10% suspension, and further diluted to an 0.5% suspension. To this suspension is added sufficient commercial formalin to make a final dilution of 0.1% formalin, and phenol is added to a final dilution of 0.25%. Two days later the preparation is tested for bacterial sterility (in the usual manner) and for absence of active virus by inoculation into mice and the yolk sac of developing chicken-eggs. The resulting preparation is a highly-active lymphogranuloma venereum antigen, useful not only for performing the cutaneous test for the diagnosis, but also for the prophylaxis and therapy, of this disease.

Alternatively, the suspension may be inactivated by heating for two hours at 60° C. on one day and for 1 hour at 60° C. the next day, instead of by formalinizing.

Example 2

Eight chicken-eggs are inoculated in the yolk-sac with 1 cc. of a 1/10–1/1000 dilution of yolk-sac harvested from eggs infected with lymphogranuloma venereum virus. After 4–5 days (or as soon as the eggs are dead), the eggs are opened, and the yolk-sacs removed and further treated as described in Example 1. A similarly highly-active lymphogranuloma venereum antigen is thus obtained.

Example 3

Chicken eggs are each inoculated in the yolk-sac with 1 cc. of a 1/10–1/10000 dilution of bacteriologically-sterile yolk-sac harvested from eggs infected by this route with lymphogranuloma venereum virus.

After about 5 days (or as soon as the eggs are moribund or dead), the eggs are opened, and the yolks are separated and made up to a 10% suspension of yolk solids with physiological saline solution. The suspension is then further treated as described in Example 1 (to separate the infectious material from other yolk constituents and inactivate the infectious agent).

Alternatively, the combined yolk and yolk-sacs are used to prepare an antigen. Thus, the yolk and the yolk-sacs are separated from the other egg material, combined, and ground with Pyrex or quartz fragments, and the resulting emulsion made up to a 10% suspension of yolk and yolk-sac solids with physiological saline solution; and the suspension is further treated as described in Example 1.

The invention may be variously otherwise embodied within the scope of the appended claims.

We claim:

1. A lymphogranuloma venereum antigen essentially comprising a non-infectious preparation of fowl-embryo material of the group consisting of yolk, yolk-sacs, and combined yolk and yolk-sacs, which has been diseased with lymphogranuloma venereum.

2. A lymphogranuloma venereum antigen essentially comprising an inactivated preparation of fowl-embryo material of the group consisting of yolk, yolk-sacs, and combined yolk and yolk-sacs, which has been diseased with lymphogranuloma venereum.

3. A lymphogranuloma venereum antigen essentially comprising a virus-freed preparation of fowl-embryo material of the group consisting of yolk, yolk-sacs, and combined yolk and yolk-sacs, which has been diseased with lymphogranuloma venereum.

4. A lymphogranuloma venereum antigen essentially comprising a non-infectious suspension of fowl-embryo yolk which has been diseased with lymphogranuloma venereum.

5. A lymphogranuloma venereum antigen essentially comprising a non-infectious suspension of fowl-embryo yolk and yolk-sacs which have been diseased with lymphogranuloma venereum.

6. The method of preparing a lymphogranuloma venereum antigen which essentially comprises propagating the agent of lymphogranuloma venereum in the yolk-sacs of developing fowl-embryos, and preparing a non-infectious aqueous suspension of embryo material of the group consisting of yolk, yolk-sacs, and combined yolk and yolk-sacs.

7. The method of preparing a lymphogranuloma venereum antigen which essentially comprises propagating the agent of lymphogranuloma venereum in the yolk-sacs of developing fowl-embryos, and preparing a non-infectious suspension of the yolk material in a suitable aqueous medium.

8. The method of preparing a lymphogranuloma venereum antigen which essentially comprises propagating the agent of lymphogranuloma venereum in the yolk-sacs of developing fowl-embryos, and preparing a non-infectious suspension of the combined yolk and yolk-sac material in a suitable aqueous medium.

9. A lymphogranuloma venereum antigen essentially comprising a non-infectious preparation of fowl-embryo yolk-sacs which have been diseased with lymphogranuloma venereum.

10. A lymphogranuloma venereum antigen essentially comprising an inactivated preparation of fowl-embryo yolk-sacs which have been diseased with lymphogranuloma venereum.

11. A lymphogranuloma venereum antigen essentially comprising a virus-freed preparation of fowl-embryo yolk-sacs which have been diseased with lymphogranuloma venereum.

12. A lymphogranuloma venereum antigen essentially comprising a formalinized preparation of fowl-embryo yolk-sacs which have been diseased with lymphogranuloma venereum.

13. A lymphogranuloma venereum antigen essentially comprising an inactivated suspension of the infectious agent in fowl-embryo yolk-sacs which have been diseased with lymphogranuloma venereum.

14. A lymphogranuloma venereum antigen essentially comprising a non-infectious preparation of chick-embryo yolk-sacs which have been diseased with lymphogranuloma venereum.

15. The method of preparing a lymphogranuloma venereum antigen which essentially comprises propagating the agent of lymphogranuloma venereum in the yolk-sacs of developing fowl-embryos, and preparing a non-infectious suspension of the yolk-sac material in a suitable aqueous medium.

16. The method of preparing a lymphogranuloma venereum antigen which comprises propagating the agent of lymphogranuloma venereum in the yolk-sacs of developing fowl-embryos, preparing a suspension of the yolk-sac material in an aqueous medium, separating the infectious material from other yolk-sac constituents, and inactivating the infectious agent.

17. The method of preparing a lymphogranuloma venereum antigen which comprises propagating the agent of lymphogranuloma venereum in the yolk-sacs of developing fowl-embryos, and formalinizing the yolk-sac material.

18. The method of preparing a lymphogranuloma venereum antigen which comprises propagating the agent of lymphogranuloma venereum in the yolk-sacs of the developing fowl-embryos, preparing a suspension of the yolk-sac material in an aqueous medium, separating the infectious material from other yolk-sac constituents by differential centrifugation in the cold, resuspending the infectious material in an aqueous medium, and inactivating the infectious agent.

GEOFFREY W. RAKE.
MORRIS F. SHAFFER.
CLARA M. McKEE.